(12) United States Patent
Yoshida

(10) Patent No.: US 6,292,257 B1
(45) Date of Patent: Sep. 18, 2001

(54) DISTANCE MEASUREMENT SYSTEM

(75) Inventor: Hideo Yoshida, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/406,831

(22) Filed: Sep. 28, 1999

(30) Foreign Application Priority Data

Sep. 30, 1998 (JP) .................................................. 09-278422

(51) Int. Cl.[7] .............................. G03B 13/00; G01C 3/08; G02B 7/28
(52) U.S. Cl. ........................... 356/3.04; 396/106; 396/120
(58) Field of Search ..................... 396/106, 120; 356/3.04, 3.07

(56) References Cited

U.S. PATENT DOCUMENTS

| 5,493,362 | * | 2/1996 | Nonaka . | |
|---|---|---|---|---|
| 5,659,387 | | 8/1997 | Yoshida | 356/4.01 |
| 5,832,324 | * | 11/1998 | Shimizu et al. | 396/106 |

FOREIGN PATENT DOCUMENTS 7181038    7/1995    (JP) .

* cited by examiner

*Primary Examiner*—Stephen C. Buczinski
(74) *Attorney, Agent, or Firm*—Leydig, Voit & Mayer, Ltd.

(57) ABSTRACT

A distance measurement system for measuring a distance with a little time difference while maintaining high accuracy. An infrared emitting diode (IRED) emits a beam of light toward an object at a distance to be measured and a position sensitive detector (PSD) receives reflected light. Outputs from the PSD are processed by signal processing circuits, and an arithmetic circuit, which issues an output as distance information. An integrating circuit integrates the signal outputted by the arithmetic circuit and outputs a signal corresponding to the results of the integration. A CPU determines the distance to the object based on the signal outputted from the integrating circuit. In this distance measurement system, the integrating circuit starts integrating the signal outputted from the arithmetic circuit, immediately after the output, i.e., distance signal, from the arithmetic circuit is stabilized.

5 Claims, 5 Drawing Sheets

DISTANCE MEASUREMENT SYSTEM

BACKGROUND OF THE INVENTION

1. Field of the Invention

The present invention relates to a system for measuring a distance to an object of distance measurement and more particularly to an active distance measurement system favorably applied to various types of cameras.

2. Related Background Art

Such an active distance measurement system applied to cameras generally includes an infrared-emitting diode (IRED) for emitting a beam of light toward an object of distance measurement, and a position sensitive detector (PSD) for receiving the emitted and reflected light beam. The signal outputted from the PSD is processed in signal processing and arithmetic circuits to be inputted therefrom as distance information into a central processing unit (CPU), by which a distance to the object of distance measurement is determined. Because an error may occur in distance measured based on one-shot light emission alone, multi-shot light emissions are generally performed thereby to obtain multiple pieces of distance information. The obtained information is typically integrated and averaged in an integrating circuit.

SUMMARY OF THE INVENTION

However, as in the distance measurement system described above, the pieces of distance information must be integrated and averaged in the integrating circuit, a considerable time may be required until the distance measurement is completed, because a time consumed during each emission is accumulated each time pulse light is emitted. More specifically, as shown in timing charts 79 to 82 of FIG. 1, the integration starts when an INT signal comes to "high" after the output from the integrating circuit in the above distance measurement system has been stabilized enough, that is, after a sufficient time (26 $\mu$s) has lapsed from a time point at which a HOLD signal reaches "high". This causes the emission period of time of the IRED to be extended to 60 $\mu$s and accordingly a period of time necessary to pass through each cycle of emission noticeably increases to (60 $\mu$s+415 $\mu$s). This results in that a considerable time is necessary to end the distance measurement.

Accordingly, a time difference occurring between half-depressing of a release button and light exposure increases, so that when it is desired to shoot such as a moving object (subject of distance measurement), a photograph having a desired composition may not be obtained.

Therefore, it is an object of the present invention to provide a distance measurement system, which can measure an object distance with a little time difference while maintaining high accuracy.

With this object in view, according to the present invention, a distance measurement system is provided, which comprises means for emitting a beam of light toward an object of distance measurement; means including a position sensitive detector for receiving the beam of light emitted toward and reflected from the object at a receiving position on said position sensitive detector corresponding to a distance to the object, said light receiving means outputting a signal corresponding to the receiving position; arithmetic means for carrying out a calculation based on the signal outputted from said light receiving means to output a signal corresponding to the distance to the object; means including an integrating capacitor charged to a reference voltage for integrating the signal outputted from said arithmetic means over time by charging or discharging said integrating capacitor by an amount corresponding to the signal outputted from said arithmetic means, said integrating means outputting a signal corresponding to the results of the integration; means for determining the distance to the object based on the signal outputted from said integrating means; and said signal outputted from said arithmetic means being integrated by said integrating means immediately after the distance signal outputted from said arithmetic means is stabilized.

According to this distance measurement system, immediately after the output representative of the distance signal from the arithmetic means is stabilized, the integrating means starts the integration of the signal outputted from the arithmetic means. Accordingly, the emission period of time required for the emission means can be decreased while maintaining the same integration time, i.e., the same distance measurement accuracy as the prior art. This enables a time difference possibly occurring until light exposure ends after the half-depression of a release button to be decreased.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The embodiments according to the invention will now be described in more detail in conjunction with the accompanying drawings. Although the embodiments according to the present invention are described below regarding active distance measurement systems applied as those for using in automatic focussing cameras, the invention is certainly not limited thereto.

Figure 2:
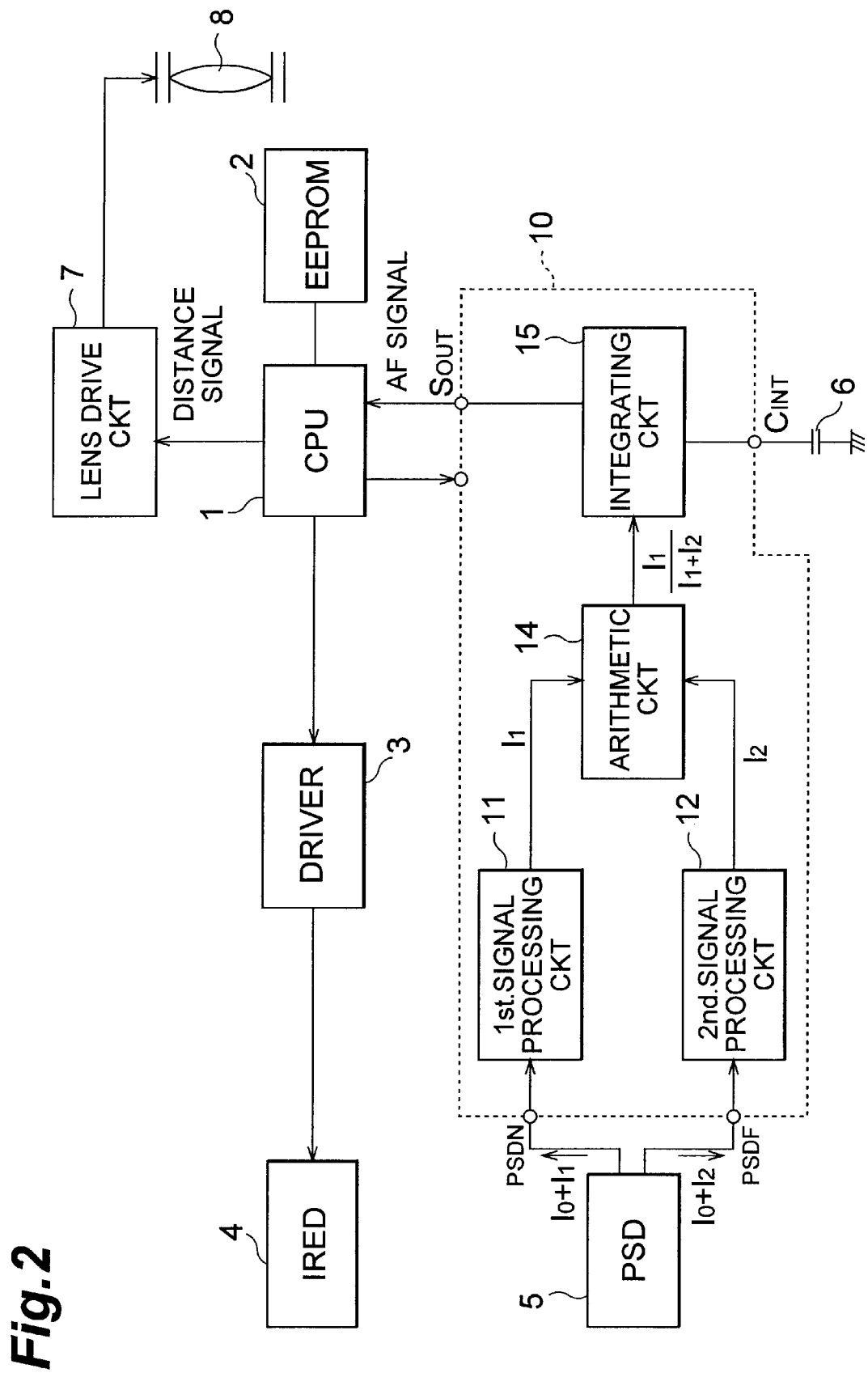
FIG. 2 is a block diagram of a distance measurement system according to an embodiment of the present invention.

FIG. 2 illustrates in a block diagram a distance measurement system according to one embodiment of the present invention. A central processing unit (CPU) 1 controls the whole of a distance measurement system-mounting camera based on programs and parameters preliminarily stored in an electrically erasable and programmable read-only memory (EEPROM) 2. In the distance measurement system, the CPU 1 controls a driver 3 to bring the infrared emission from an infrared emitting diode (IRED) 4 under control. Also, the CPU 1 controls the operation of an automfocus integrated circuit (AFIC) 10 and receives an AF signal outputted from the AFIC 10.

The infrared radiation emitted by the IRED 4 is projected through a light-projecting lens (not shown), positioned in front of the IRED 4, toward the distance measurement object. This infrared radiation is partially reflected from the distance measurement object and the reflected light is received through a light-receiving lens (not shown), provided in front of a position sensitive detector (PSD) 5, at a certain position on the light-receiving surface of the PSD 5. The light-receiving position corresponds to a distance to the measurement object.

The PSD 5 outputs two signals I1 and I2 in accordance with the infrared receiving positions. The signal I1 is a "near-side" signal, which increases much more, the shorter the distance is if the received luminous energy is fixed, and the signal I2 is a "far-side" signal, which increases much more, the longer the distance is if the received luminous energy is fixed. A sum of the signals I1 and I2 represents the luminous energy of the reflected light received by the PSD 5. The "near-side" signal I1 is inputted to the PSDN terminal of the AFIC 10 and the "far-side" signal I2 to the PSDF terminal of the AFIC 10. However, in fact, a stationary-light component I0 according to exterior conditions is added to each of the "near-side" signal I1 and the "far-side" signal I2, and the resultant signals are inputted into the AFIC 10.

The AFIC 10 is composed of the first and second signal processing circuits 11 and 12, the arithmetic circuit 14 and the integrating circuit 15. The first signal processing circuit 11 receives the signal (I1+I0) outputted from the PSD 5 and outputs the "near-side" signal I1 with the stationary-light component I0 being removed therefrom. The second signal processing circuit 12 receives the signal (I2+I0) outputted from the PSD 5 and outputs the "far-side" signal I2 with the stationary-light component I0 being removed therefrom.

The arithmetic circuit 14 receives both of the "near-side" signal I1 outputted from the first signal processing circuit 11 and the "far-side" signal I2 outputted from the second signal processing circuit 12 to calculate an output ratio I1/(I1+I2) and outputs an output ratio signal representing the results of the calculation. It is noted that the output ratio I1/(I1+I2) represents a light-receiving position on the light-receiving surface of the PCD 5, that is, the distance to the object of distance measurement.

The integrating circuit 15 receives the output ratio I1/(I1+I2) signal and, in corporation with an integrating capacitor 6 connected to the CINT terminal of the AFIC 10, integrates the output ratio multiple times to improve an S/N ratio. The integrated output ratio is outputted as an AF signal through the SOUT terminal of the AFIC 10. The CPU 1 receives the AF signal outputted from the AFIC 10 and converts it into a distance signal after the predetermined operation has been performed. The distance signal is transmitted to a lens drive circuit 7, which causes a taking lens 8 to begin the focusing operation.

Figure 3:
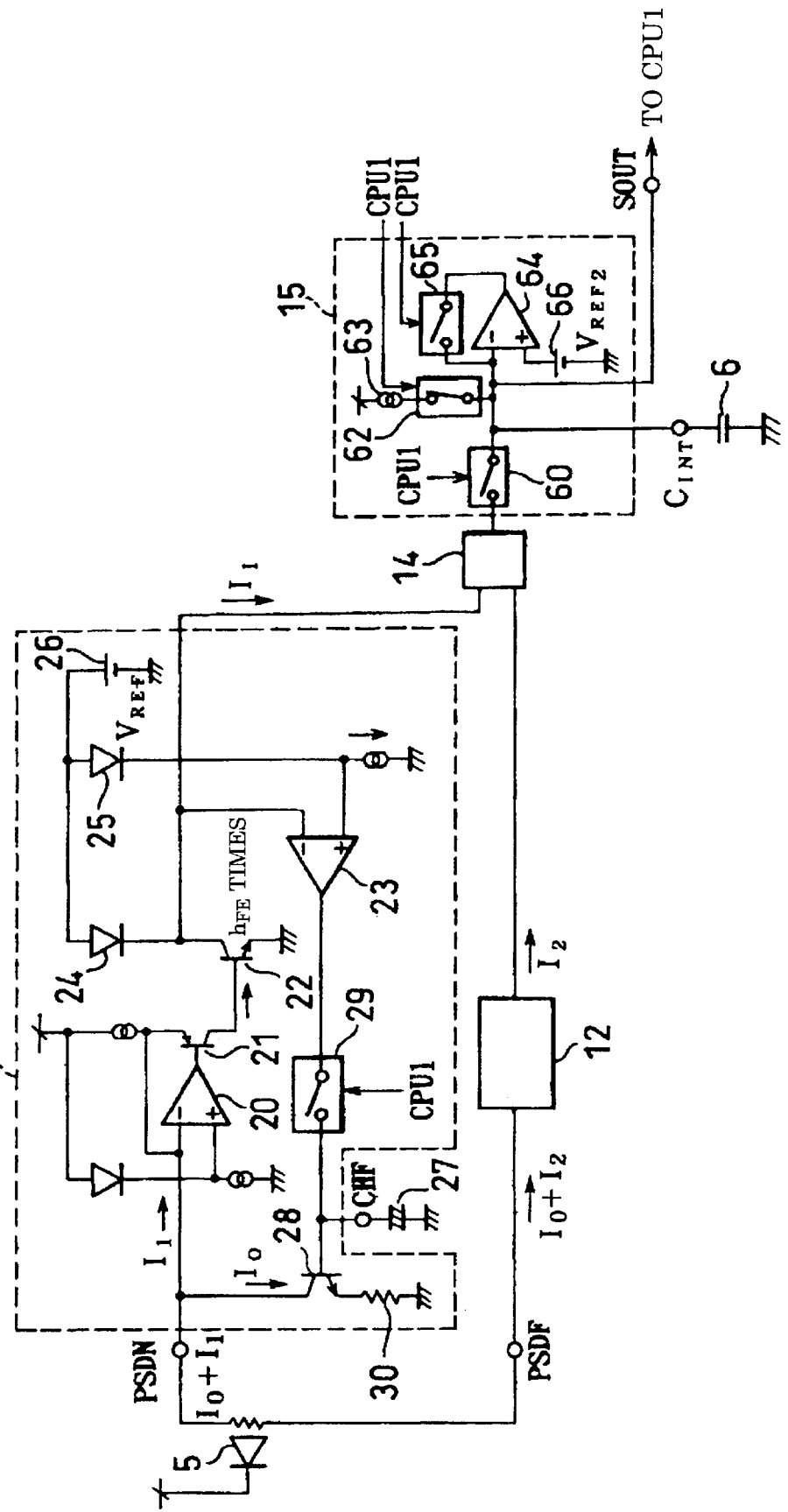
FIG. 3 is a circuit diagram showing first and second signal processing circuits in the distance measurement system according to the above embodiment.

The first signal processing circuit 11 and the integrating circuit 15 of the AFIC 10 will now be explained with respect to a concrete circuit configuration thereof. FIG. 3 is a circuit diagram showing the first signal processing circuit 11 and the integrating circuit 15. It is to be noted that the second signal processing circuit 12 also has the same configuration as the first signal processing circuit 11.

As heretofore explained, the first signal processing circuit 11 is a circuit, which receives an input consisting of the stationary-light signal I0 and the "near-side" signal I1 outputted from the PSD 5 and which issues an output consisting of only the "near-side" signal I1 with the stationary-light signal I0 being removed therefrom. More specifically, the "near-side" terminal of the PCD 5 is connected through the PSDN terminal of the AFIC 10 to a negative (−) input terminal of an operational amplifier 20 in the first signal processing circuit 11. An output terminal of the operational amplifier 20 is connected to a base terminal of a transistor 21, of which a collector terminal is connected to a base terminal of a transistor 22. A collector terminal of the transistor 22 is connected not only to a negative (−) input terminal of an operational amplifier 23, but also to the arithmetic circuit 14. Furthermore, the collector terminal of the transistor 22 is connected to a cathode terminal of a diode 24 and the (+) input terminal of the operational amplifier 23 is connected to a cathode terminal of a diode 25. An anode terminal of each of the diodes 24 and 25 is connected to a first reference power source 26.

Mounted externally to a CHF terminal of the AFIC 10 is a stationary-light-removal capacitor 27, which is connected to a base terminal of a stationary-light-removal transistor 28 in the first signal processing circuit 11. The stationary-light-removal capacitor 27 and the operational amplifier 23 are connected together through a switch 29. The on-off operation of the switch 29 is under the control of the CPU 1. A collector terminal of the stationary-light-removal transistor 28 is connected to the (−) input terminal of the operational amplifier 20 and an emitter terminal of the transistor 28 is grounded through a resistor 30.

The integrating circuit 15 may be formed as described hereinafter. An integrating capacitor 6 attached externally to a CINT terminal of the AFIC 10 is connected through a switch 60 to the output terminal of the arithmetic circuit 14 and through a switch 62 to a constant current source 63. Also, the integrating capacitor 6 is further connected through a switch 65 to an output terminal of an operational amplifier 64 and directly to a (−) input terminal of the operational amplifier 64. The potential of the capacitor is applied to the SOUT terminal of the AFIC 10. It is noted that these switches 60, 62 and 65 are controlled by control signals from the CPU 1 and a (+) input terminal of the operational amplifier 64 is connected to a second reference power source 66.

Figure 1:
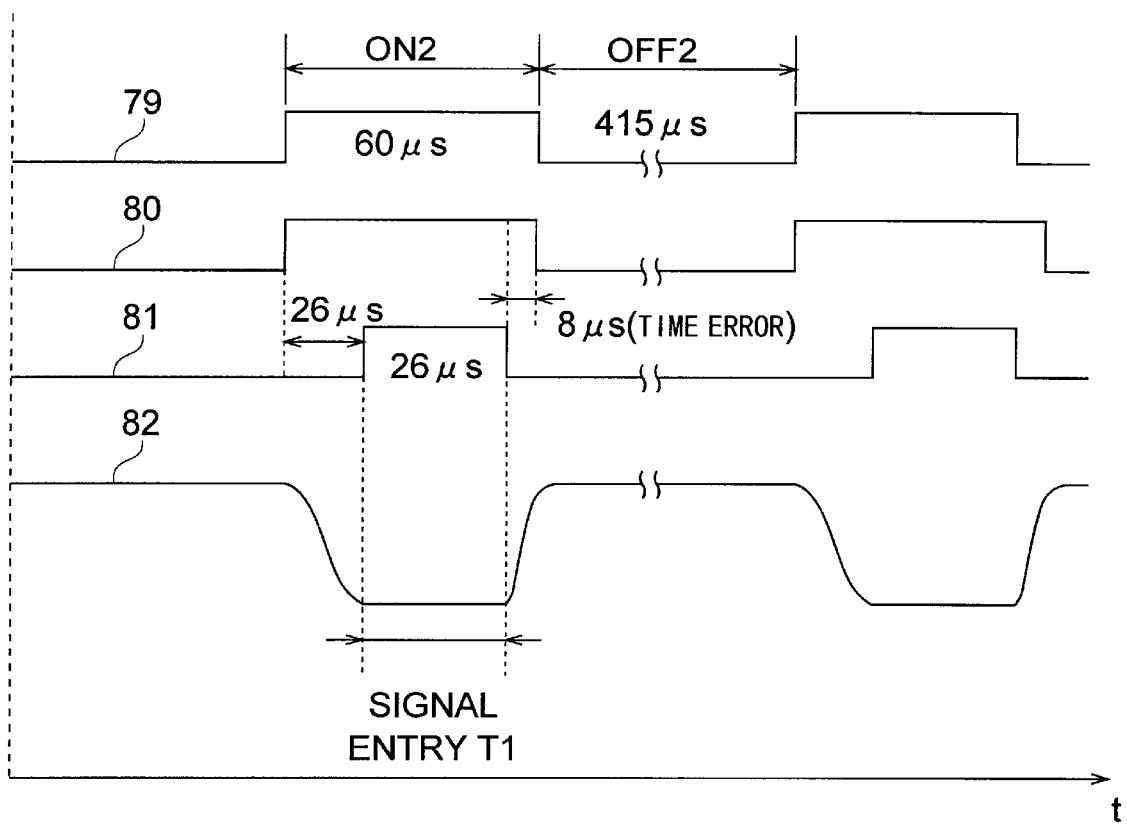
FIG. 1 is a timing chart for explaining the operation of a prior distance measurement system.

Next, the operation of the AFIC 10 will be described with reference to FIGS. 1 and 2. The CPU 1 causes the switch 29 in the first signal processing circuit 11 to be turned to "on" when the IRED 4 is not allowed to emit infrared. At this time, the stationary-light component I0 outputted from the PSD 5 is inputted into the first signal processing circuit 11, in which it is current amplified by a current amplifier comprising the operational amplifier 20 and the transistors 21 and 22. The stationary-light component I0 is then logarithmically compressed in the diode 24 to be converted into a voltage signal, which is in turn inputted to the (−) input terminal of the operational amplifier 23. When the signal inputted into the operational amplifier 20 is large enough, the cathode potential of the diode 24 is increased in value. Thus, the signal outputted from the operational amplifier 23 is also increased in value and the stationary-light-removal capacitor 27 is charged. As this causes the base current to flow through the transistor 28, the collector current also flows the transistor 28, so that a signal component, which is to be inputted into the operational amplifier 20, of the signal I0 inputted into the first signal processing circuit 11 is decreased. With the condition that this closed-loop operation is generally stabilized, the whole signal I0 inputted into the first signal processing circuit 11 flows through the transistor 28 and the stationary-light removal capacitor 27 is charged to a level corresponding to the value of the base current at that time.

When the CPU 1 causes the IRED 4 to emit the infrared and the switch 29 to be turned to "on", then the signal (I1+I0) is outputted from the PSD 5. The stationary-light component I0 of this signal flows as a collector current through the transistor 28, to which the base potential is applied by the electric charge stored in the stationary-light-removal capacitor 27. With respect to the "near-side" signal I1, it is current amplified by the current amplifier device consisting of the operational amplifier 20 and the transistors 21 and 22. The "near-side" signal I1 is then logarithmically compressed in the diode 24 to be converted into a voltage signal, which is in turn outputted. In other words, only the "near-side" signal I1 with the stationary-light component I0 being removed is outputted from the first signal processing circuit 11 and inputted into the arithmetic circuit 14. Also, in the second signal processing circuit 12, only the "far-side" signal I2 with the stationary-light component I0 being removed is outputted therefrom and inputted into the arithmetic circuit 14 in a similar manner to that in the first signal processing circuit 11.

Either of the "near-side" signal I1 outputted from the first signal processing circuit 11 and the "far-side" signal I2 outputted from the second signal processing circuit 12 is inputted into the arithmetic circuit 14, in which the output ratio I1/(I1+I2) is calculated and from which the calculated output ratio is inputted into the integrating circuit 15. While the IRED 4 emits the predetermined number of infrared-light pulses, the switch 60 in the integrating circuit 15 is maintained in the "on" state and the switches 62 and 65 are retained in the "off" state so that the output ratio signal outputted from the arithmetic circuit 14 is stored in the integrating capacitor 6. After the emission of the predetermined number of infrared-light pulses, the switches 60 and 65 are turned to the "off" and "on" states, respectively, so that the charge stored in the integrating capacitor 6 is decrementally offset by the charge of inverse potential supplied through the output terminal of the operational amplified 64.

The CPU 1 monitors the potential of the integrating capacitor 6 to determine a time necessary for the capacitor 6 to revert to the original potential level. The CPU 1 then seeks for the AF signal based on the determined time and further determines the distance to the object of distance measurement.

Figure 4:
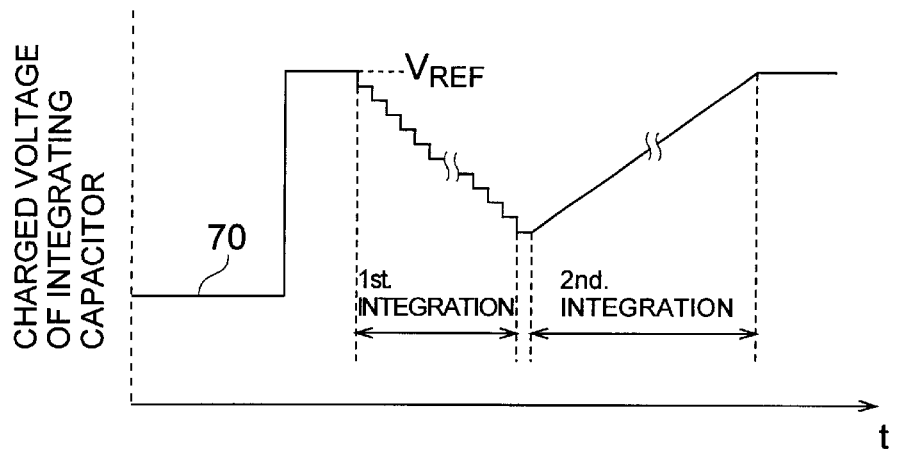
FIG. 4 is a timing chart for explaining the operation of the distance measurement system according to the above embodiment.

Next, the operation of the distance measurement according to the aforementioned preferred embodiment would be explained. When the release button is half depressed, a series of distance measuring procedures start. The AFIC 10 is allowed to restart furnishing the power source voltage and the switch 65 is turned to the "on" state, causing the integrating capacitor 6 to be preliminarily charged to the reference voltage $V_{REF}$ (see FIG. 4). After the completion of the precharging, the switch 65 is turned to the "off" state and the IRED 4 is driven to emit the infrared-light pulses by an emission timing signal of a predetermined duty ratio outputted from the CPU 1 to the driver 3. The infrared light emitted by the IRED 4 is reflected from the object of distance measurement and then received by the PSD 5.

Figure 5:
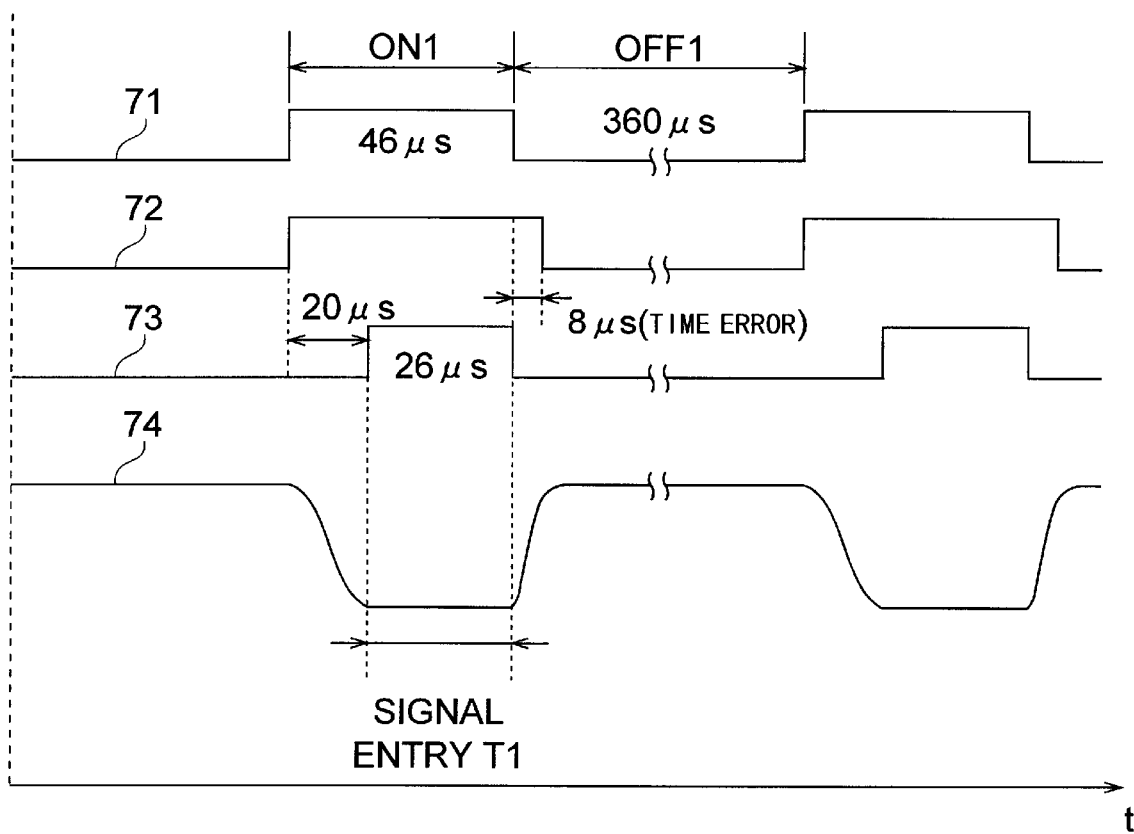
FIG. 5 is a timing chart for further explaining the operation of the distance measurement system according to the above embodiment.

As will be understood from timing charts 71 to 74 shown in FIG. 5, simultaneously with the emission from the IRED 4, the switch 29 in the first signal processing circuit 11 is turned to the "off" state (HOLD signal is "H") so that the "near-side" signal I1 is inputted into the arithmetic circuit 14 with the stationary-light component I0 being removed therefrom. Also, the "far-side" signal I2 from the second signal processing circuit 12 is inputted into the arithmetic circuit 14 with the stationary-light component I0 being removed therefrom. The arithmetic circuit 14 outputs data regarding the output ratio I1/(I1+I2) calculated based on the "near-side" and "far-side" signals I1 and I2. Immediately at the point that this output is stabilized (after 20 $\mu$s from the rise of HOLD signal to "H"), the switch 60 in the integrating circuit 15 is turned to "on" (INT signal is "H") to input into the integrating capacitor 6 a negative voltage corresponding in value to the output ratio outputted from the arithmetic circuit 14.

The switch 60 in the integrating circuit 15 is turned to "off" (INT signal is "L") simultaneously with the extinction of the IRED 4 (IRED signal is "L". After the lapse of a period of signal error time (8 $\mu$s from the lowering of the IRED signal to "L"), the switch 29 in the first signal processing circuit 11 is turned to "on" (HOLD signal is "L") to start storing, in the stationary-light-removal capacitor 27, the stationary-light component I0 of the output signal outputted from the PSD 5.

The integrating capacitor 6 in the integrating circuit 15 receives the output, i.e., the distance information signal, outputted from the arithmetic circuit 14 and discharges a charge corresponding in value to the magnitude of the distance information signal. In other words, the voltage across the integrating capacitor 2 decreases step by step whenever receiving each distance information signal (first integration), as shown in a timing chart 70 of FIG. 4. An amount of voltage drop per each step may represent by itself a piece of distance information corresponding to a distance to an object of distance measurement. However, in the preferred embodiments, distance information is defined as a sum of voltage drops each developed by one pulse emission of the IRED 10.

Even after the integrating capacitor 6 has received the predetermined number of inputs corresponding to the number of emissions, the switch 60 is maintained in the "off" state. However, the switch 62 is turned to the "on" state by the signal from the CPU 1. This causes the integrating capacitor 6 to be charged at a predetermined rate determined by the rating of the constant current source 4 (second integration).

During the period or duration of the second integration, a not shown comparator compares the voltage of the integrating capacitor 6 and the reference voltage $V_{REF}$ to find out which is higher and when determined that they are coincident with each other, causes the switch 62 to be turned to "off". This causes the charging of the integrating capacitor 6 to be stopped and the CPU 1 to commence determining a time required performing the second integration. As the charging rate of the constant current source 4 is uniform, the sum of the distance information signals inputted into the integrating capacitor 6 during one distance measurement, that is, the distance to the object of the distance measurement can be determined from the time required to perform the second integration.

Subsequently, the release button is fully depressed and then the CPU 1 operates to control the lens drive circuit 7 based on the determined distance so as to appropriately adjust the focus of the taking lens 8. Also, a shutter (not shown) opens causing exposure to light. In this manner, the release operation can be followed by the series of shooting procedures comprising charging, distance measuring (first and second integration), focussing and exposing.

With the distance measurement system according to the present embodiment, the switch 60 in the integrating circuit 15 is turned to the "on" state (INT signal is "H") immediately after the output from the arithmetic circuit 14 has been stabilized, a period of time for each emission (46 µs) of the IRED 4 can be decreased as compared with that of the prior distance measurement system and accordingly a period of time necessary for one complete emission cycle can be decreased to 46 µs+360 µs, while maintaining the same integration period of time (26 µs) as that in the prior system. Accordingly, a period of time necessary to complete the distance measurement can be shortened. More specifically, the duty ratio of emission to extinction must be equal in value to the duty ratio of emission to extinction of the IRED in the prior distance measurement system so that the performance of the IRED 4 can be maintained. This means that if a period of time for emission can be decreased, a period of time for extinction of the IRED 4 also can be decreased, resulting in that a period of time necessary for one complete emission cycle can be decreased. Accordingly, a period of time necessary to complete the distance measurement can be shortened and a time difference occurring between a start of release operation and an end of light exposure can also be decreased.

The present invention is not limited to the aforementioned embodiments and many modifications can be made thereto. For example, the invention is also applicable to a system including such an integrating circuit, in which charging and discharging of an integrating capacitor are carried out in a manner contrary to that in the aforementioned embodiments. That is, during the period of the first integration, the integrating capacitor is charged so that the voltage level thereof ascends step by step and then discharged at a time in the second integration.

While the distance to the object is obtained on the basis of the time needed in the second integral, it may also be obtained on the basis of the result of the A/D conversion of the integral voltage value obtained by the first integral, namely, the voltage value which is reduced due to the discharge of integral capacitor or the voltage value which is increased due to the charge of integral capacitor.

Figure 6:
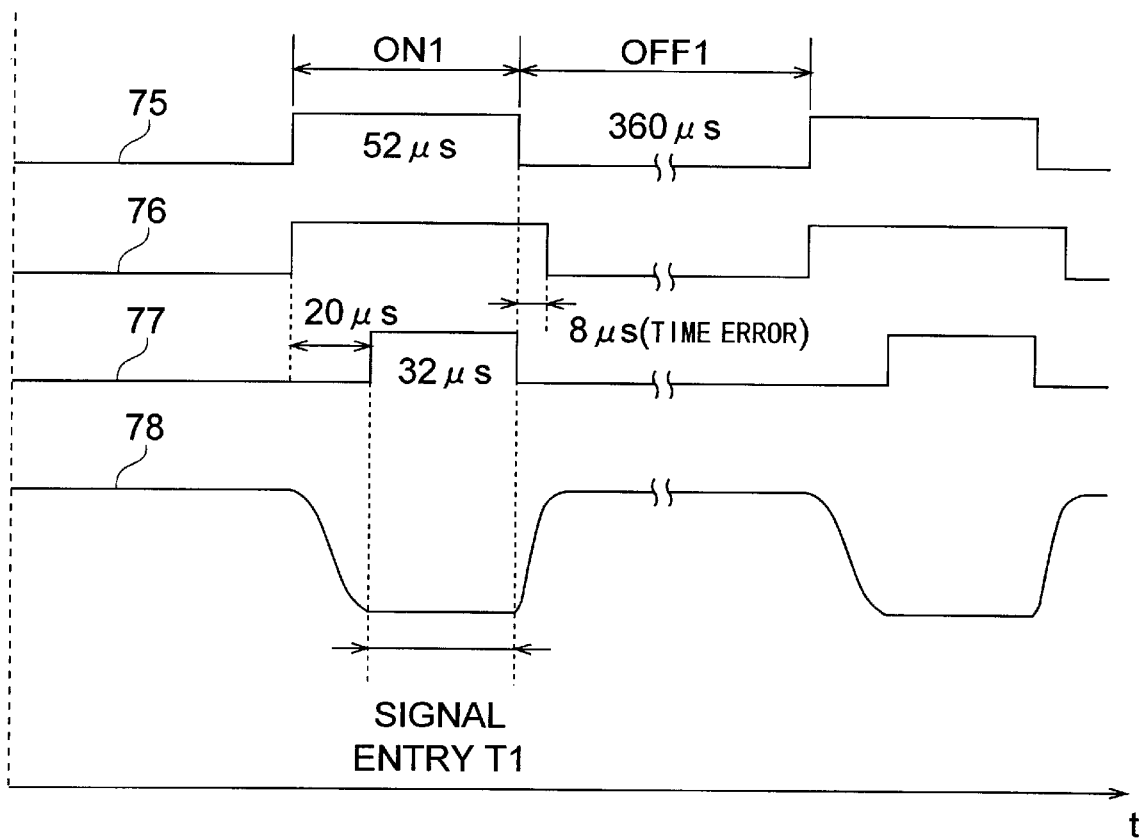
FIG. 6 is a timing chart for explaining the operation of the distance measurement system according to a different embodiment.

Furthermore, as shown by time charts 75 to 78 in FIG. 6, although the switch 60 in the integrating circuit 15 is turned to "on" (INT signal is "H") immediately after the output of the arithmetic circuit 14 is stabilized, the integration time (i.e., a period of time during which INT signal is retained in "H") may be set to 32 µs. In this case, as the switch 60 in the integrating circuit 15 is also turned to "off" (INT signal is "L") simultaneously with the extinction of the IRED 4, the integration time can be prolonged. Thus, not only the distance measurement accuracy can be improved, but also the emission period of time of the IRED 4 can be shortened (52 µs) as compared with the prior distance measurement system, resulting in that a period of time necessary for one complete emission cycle can be decreased (52 µs+360 µs).

According to the present invention, immediately after the output representative of the distance signal from the arithmetic means is stabilized the integrating means starts the integration of the signal outputted from the arithmetic means. Accordingly, the emission period of time required for the emission means could be decreased while maintaining the same integration time as the prior art, that is, while maintaining the same distance measurement accuracy as the prior art. This enables a time difference possibly occurring until light exposure ends after the half-depression of a release button to be decreased.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A distance measurement system comprising:

means for emitting a beam of light toward an object at a distance to be measured;

light detecting means including a position sensitive detector for detecting the beam of light emitted toward and reflected from the object at a detecting position on said position sensitive detector corresponding to the distance to the object, said light detecting means outputting a signal corresponding to the detecting position;

arithmetic means for carrying out a calculation, based on the signal output from said light detecting means, to output a distance signal corresponding to the distance to the object;

integrating means including an integrating capacitor charged to a reference voltage for integrating the distance signal output from said arithmetic means by charging or discharging said integrating capacitor by an amount corresponding to the distance signal output from said arithmetic means, said integrating means outputting a signal corresponding to the integrating; and means for determining the distance to the object based on the signal output from said integrating means wherein the distance signal output from said arithmetic means is integrated by said integrating means during a time period beginning immediately after the distance signal output from said arithmetic means is stabilized and ending simultaneously with extinguishing of the beam of light emitted by said means for emitting.

2. The distance measurement system according to claim 1, wherein said light emitting means is an infrared-emitting diode.

3. The distance measurement system according to claim 1, wherein said light detecting means outputs a plurality of signals corresponding to respective detecting positions.

4. The distance measurement system according to claim 3, wherein said arithmetic means carries out the calculation based on a power ratio of the signals output from said light detecting means.

5. The distance measurement system according to claim 1, wherein said arithmetic means and said integrating means are consolidated into an automatic focussing integrated circuit.

* * * * *